US008605683B2

(12) United States Patent
Garcia Martin et al.

(10) Patent No.: US 8,605,683 B2
(45) Date of Patent: Dec. 10, 2013

(54) PRE-EMPTIVE ACCESS NETWORK SWITCHING

(75) Inventors: Miguel-Angel Garcia Martin, Pozuelo de Alarcon (ES); Pablo Martinez De La Cruz, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/702,346

(22) PCT Filed: Jun. 22, 2010

(86) PCT No.: PCT/EP2010/058838
§ 371 (c)(1),
(2), (4) Date: Dec. 6, 2012

(87) PCT Pub. No.: WO2011/160682
PCT Pub. Date: Dec. 29, 2011

(65) Prior Publication Data
US 2013/0208696 A1 Aug. 15, 2013

(51) Int. Cl.
*H04W 4/00* (2009.01)
*H04W 72/00* (2009.01)
*H04W 36/00* (2009.01)
*H04J 1/16* (2006.01)
*H04L 12/66* (2006.01)

(52) U.S. Cl.
USPC ........... 370/331; 370/236; 370/352; 455/436; 455/450

(58) Field of Classification Search
USPC .................. 370/236, 331, 352; 455/436, 450
See application file for complete search history.

(56) References Cited

U.S. PATENT DOCUMENTS

| 7,113,782 | B2 * | 9/2006 | Lucidarme ................. 455/432.1 |
| 7,120,686 | B2 * | 10/2006 | Sasabe et al. ................. 709/224 |
| 7,215,958 | B2 * | 5/2007 | Kovacs et al. ................. 455/436 |
| 7,725,122 | B1 * | 5/2010 | Balakrishnan et al. ....... 455/522 |
| 7,792,530 | B2 * | 9/2010 | Tariq et al. .................... 455/436 |

(Continued)

FOREIGN PATENT DOCUMENTS

WO 2009091295 A1 7/2009

*Primary Examiner* — Luat Phung
*Assistant Examiner* — Kai Chang
(74) *Attorney, Agent, or Firm* — Rothwell, Figg, Ernst & Manbeck, P.C.

(57) ABSTRACT

An access network connection controller is disclosed for ordering a mobile terminal to switch from a connection to a first access network to a connection to a second access network in order to ensure that a good connection to the mobile terminal is maintained when the mobile terminal enters an area in which connection to the first access network may be restricted and the second access network may be beneficial. The access network connection controller is operable to receive movement information representative of the movement of the mobile terminal connected to a first access network; to determine from the movement information whether the mobile terminal is approaching a restricted area wherein connection to a second access network may be beneficial and to generate a command ordering the switching of the connection mobile terminal from the first access network to the second access network before the mobile terminal enters the restricted area. By ordering a mobile terminal to switch its connection to another access network in advance of the mobile terminal entering an area in which connection to the mobile terminal from its current access network may be restricted, good connection to the mobile terminal is ensured at all times and the user of the mobile terminal does not experience any degradation in performance.

10 Claims, 13 Drawing Sheets

(56) References Cited

U.S. PATENT DOCUMENTS

| | | | | |
|---|---|---|---|---|
| 8,086,235 | B2* | 12/2011 | Touray et al. | 455/436 |
| 8,165,587 | B2* | 4/2012 | Dahlen et al. | 455/439 |
| 8,451,795 | B2* | 5/2013 | Ho et al. | 370/331 |
| 2005/0215241 | A1* | 9/2005 | Okada | 455/414.1 |
| 2006/0212570 | A1* | 9/2006 | Aritsuka et al. | 709/224 |
| 2006/0274698 | A1* | 12/2006 | Twitchell, Jr. | 370/331 |
| 2007/0133469 | A1* | 6/2007 | Shin et al. | 370/331 |
| 2008/0159232 | A1 | 7/2008 | Thalanany et al. | |
| 2010/0003980 | A1 | 1/2010 | Rune et al. | |
| 2010/0157986 | A1* | 6/2010 | Rao et al. | 370/352 |
| 2011/0032896 | A1* | 2/2011 | Cubic et al. | 370/329 |
| 2011/0188455 | A1* | 8/2011 | Suzuki et al. | 370/328 |
| 2011/0207458 | A1* | 8/2011 | Tanaka et al. | 455/435.1 |
| 2012/0094667 | A1* | 4/2012 | Nishida et al. | 455/435.1 |

\* cited by examiner

PRE-EMPTIVE ACCESS NETWORK SWITCHING

CROSS-REFERENCE TO RELATED APPLICATION

This application is a 35 U.S.C. §371 National Phase Entry Application from PCT/EP2010/058838, filed Jun. 22, 2010, and designating the United States, the disclosure of which is incorporated by reference herein.

TECHNICAL FIELD

The present invention relates to the area of Packet Core technologies in wireless networks. In particular, the present invention relates to ordering a mobile terminal to switch from a first access network to a second access network in order to ensure that a good connection to the mobile terminal is maintained when the mobile terminal enters an area in which connection to the first access network may be restricted and the second access network may be beneficial.

BACKGROUND

Throughout the present document the term User Equipment (UE) is used. The term UE refers to any type of mobile terminal, such as a mobile telephone, personal digital assistance (PDA), etc, and the terms UE and mobile terminal are interchangeable.

Known wireless networks can comprise an "Access Network Discovery and Selection Function" (ANDSF), which is described for example in chapter 4.8 of 3GPP specification 3GPP TS 23.402 V9.4.0 (March 2010), "Architecture enhancements for non-3GPP accesses".

The packet core network and system referred to therein ("Evolved Packet Core Network" EPC, "Evolved 3GPP PS Domain", EPS) allows a UE to be provided, via the ANDSF, with policies for selecting access networks through which to connect to the packet core network (EPC).

The information provided by the ANDSF allows the UE to scan for access networks and to decide which access network to select among a plurality of access networks, based on data and policies.

Detailed background information of the current state of the art with respect to the ANDSF, and its interaction with UE(s), is provided below.

The ANDSF is a network element that contains data management and control functionality necessary to provide network discovery and selection assistance data in accordance with the operator(s) policy.

The introduction of ANDSF does not impact on the attach procedures for any of the accesses. In particular, it does not interfere with the existing 3GPP PLMN selection mechanisms used for the 3GPP Access Technologies.

ANDSF defines a simple client-server architecture with single Access Network Info Request and Response messages. UEs may contact the ANDSF server by sending an Access Network Info Request message to it. The ANDSF server responds to the UE by sending an Access Network Info Response message. The ANDSF is specified in 3GPP TS 23.402, "Architecture enhancements for non-3GPP accesses", and 3GPP TS 24.302, "Access to the 3GPP Evolved Packet Core (EPC) via non-3GPP access networks".

In Access Network Info Response messages, the ANDSF provides two types of information: an inter-system mobility policy and access network discovery information.

With an inter-system mobility policy, an operator, or any other organization maintaining an ANDSF server, can affect which networks UEs are using.

For example, an inter-system mobility policy may contain a prioritized network list that advises the UE about a priority order an which it can consider access networks during the access network selection process. The inter-system mobility policies received from the ANDSF take precedence over those statically provisioned in the UE.

The UE can be configured in automatic or manual mode. In automatic mode, the UE may, at its discretion, accept policies and execute changes of access networks according to the received policies. In manual mode, the consent of the user is required prior to accepting a policy and executing it.

In the above known system, policies sent by the ANDSF are merely advice for selecting by the UE an access network, for example in case of roaming or handover.

Access network discovery information is intended to help the UE to discover networks in its neighbourhood. For example, the access network discovery information may contain information on the network type, network ID, used radio frequency and channel. With this information, the UE may perform a network scan (i.e. discovery) more efficiently, since it does not need to go through all the possible access network technologies and frequency bands. By nature, the access network discovery information may be tied to a specific location and is also more short-lived than network selection information.

The ANDSF implements the S14 interface towards the User Equipment (UE). The interface is used to provide information on access networks available in the vicinity of the UE and information on operator's preference on these access networks. The S14 interface is implemented with OMA Device Management V1.2, OMA-ERELD-DM-V1_2_1, WAP Push OMA Push Architecture V2.3, OMA-AD-Push-V2_3-20091013-C, and a security mechanism that includes OMA DM bootstrap, secure HTTPS, IETF RFC 2616: Hypertext Transfer Protocol-HTTP/1.1, or GAA bootstrap, 3GPP TS 33.919: Generic Authentication Architecture (GAA); System description.

The information provided by the ANDSF is structured in a so-called OMA DM Managed Object, MO, according to what is specified in 3GPP TS 24.312, "Access Network Discovery and Selection Function (ANDSF) Management Object (MO).

The UE and ANDSF 814 interface supports both a pull and a push mode. In pull mode the UE initiates the communication to retrieve the data. In push mode the ANDSF initiates the communication to send data to the UE.

In order for the UE to receive information from the ANDSF, the UE has to have IP connectivity and to have discovered the ANDSF. If the ANDSF needs to push data and the UE does not have IP connectivity, or has not discovered the ANDSF, the ANDSF can use WAP push to force the UE to trigger the process.

The ANDSF can be located in the home network (H-ANDSF 1002) or in a visited network (V-ANDSF 1003), as shown in FIG. 1. For a UE 1001 that is roaming, it is possible that the UE 1001 acquires data from both the H-ANDSF 1002 and V-ANDSF 1003. In any case, the H-ANDSF 1002 and V-ANDSF 1003 do not have an interface between them. The interface specified between the UE 1001 and any of the H-ANDSF 1002 or V-ANDSF 1001 is the S14 interface.

The UE 1001 can also be statically provisioned with inter-system mobility policy and access network discovery information. In case the UE 1001 also acquires the same type of information from the network, the information acquired from the ANDSF has precedence over statically provisioned information in the UE 1001.

FIG. 2 shows a general information flow demonstrating signalling for both push and pull operation modes. The ANDSF 2002, at any time, can decide to push policy rules and discovery information to the UE 1001, using, for instance, WAP Push, as in step 901. The next steps are common for both push and pull modes. In step 902, the UE 1001 attaches its location information and requests the ANDSF 2002 to send the policy rules and discovery information. In step 903, the ANDSF 2002 filters the policy rules and discovery information according to the current location of the UE 1001 and then sends this filtered policy rules and discovery information to the UE 1001. Then the UE 1001 may need to switch new interfaces on or off, to try to attach to a new network (step 904), according to the information received from the ANDSF 2002. Eventually, the UE 1001 will attach to the new access network (step 905).

ANDSF 2002 is the node that manages two types of information: intersystem mobility policy and access network discovery information. Additionally, the UE 1001 is able to send to the ANDSF 2002 its UE current location.

An intersystem mobility policy is a set of operator-defined rules and preferences that affect the intersystem mobility decisions taken by the UE 1001. Therefore, intersystem mobility policies provide the UE 1001 with the means to prioritize the access network used by the UE 1001.

The access network discovery information merely provides the UE 1001 with additional information that helps the UE 1001 to gain access to the access network defined in the policy.

The ANDSF 2002 merely provisions the UE 1001 over the S14 interface with information policies for selecting access networks, wherein the final decision relies on information configured in the UE, and/or in decisions made by the UE's user.

The ANDSF MO contains three big chunks of data:

Inter-system Mobility Policy Rules: Composed of several conditions, including access network types (e.g. 3GPP, 3GPP2, WLAN, WiMAX), access network identifiers (e.g. PLMN, TAC. RAC, BSSID, etc), validity areas and time frames, among others, and a priority. The highest priority matched rule determines the access to be selected by the UE 1001.

Discovery Information: The discovery information data provides the UE 1001 with suitable data for helping in the discovery of access networks. This data contains the type of access network for which discovery information is provided (e.g., 3GPP, 3GPP2, WLAN, WiMAX); the access network area (e.g. PLMN, TAC, NAP-ID, BSSID, etc); and additional information on the specific access network.

UE location: The UE current location provides a placeholder for the UE 1001 to provide its current location to the ANDSF 2002, in terms of access network parameters or geographical location. This is used to filter the irrelevant data for the current location of the UE 1001.

Consider a scenario where a core network 3005 is connected to two or more access networks, as depicted in FIG. 3. Access networks are available to the UE 1001, although it is not necessary that each access network provides access to the UE 1001 simultaneously at a given instance of time.

Assume that a UE 1001 is moving along a path, where a path is a successive series of positions relative to the location of a mobile user equipment.

For example, the UE 1001 may be located in a car that is moving at a certain speed in a highway or the UE 1001 may be located in a train that is moving over railway tracks, as shown in FIG. 4.

A problem addressed by embodiments of the present invention is now described with the help of FIG. 5.

A user and his UE 1001 are located in a moving car. The UE 1001 is able to connect to a number of access networks of the same or different types (e.g. 3GPP, WiMAX, WLAN, etc) installed along the path in a tunnel that the car can traverse (a similar example could be access networks available in a train where a user and his UE travel, which can be alternative to the current access network to which the UE currently attaches). In the example, the UE 1001 is assumed to be attached to the operator's core network 3005 via Access Network 1, which is one of the many possible access networks that the user can use to connect to the operator's core network. Some of these access networks can be preferred, under the UE's Home operator point of view, over others due to, for example, cost effectiveness, special agreements with the corresponding Visited operator, etc. In this context, the ANDS' 2002 can provide the UE 1001 with policies for selecting among these access networks.

In the considered scenario, the car is travelling along a highway. The highway comprises a trajectory that traverses a tunnel, for which the current access network that the UE 1001 is connected to, Access Network 1, does not offer coverage.

Now assume that a second access network, Access Network 2, offers coverage in the tunnel in which Access Network 1 does not provide coverage.

When known systems encounter the above-described scenario, the UE 1001 enters the tunnel, detects the lack of Access Network 1, switches on at least one additional interface corresponding to Access Network 2, samples that interface until a beacon is received, and tries to connect or attach to the home network via Access Network 2.

These processes of take time, typically ranging from a few seconds to several minutes. During the period of time from the loss of connectivity to Access Network 1 to the moment connectivity is established with Access Network 2, the UE 1001 is not able to get communication services and to be engaged in communications of any kind. Furthermore, the time before communication to the UE 1001 is re-established will increase if, for example, Access Network 2 denies access to the user of the UE 1001, and the UE 1001 has to repeat the operation with any of the remaining access networks.

Moreover, with regard to already established communications, if the UE 1001 moves at high speeds, for example if the user is travelling in a high-speed train or on a fast road, handover mechanisms can fail because the UE 1001 moves away from the cell to which the handover is being attempted before the handover process itself is completed.

The problem has been described by way of examples. However, it will be appreciated that the same problem occurs with many different types of area where the access network the UE 1001 is currently attached to cannot, or should preferably not, keep on providing services (for example, roaming services allowing said UE to register and initiate/receive incoming communications, or handover services allowing said UE 1001 to maintain ongoing communications).

For example, reasons for an access network not being able to keep on providing a service in a geographical area include:
1. The access network does not have coverage in that area.
2. The access network is congested, or suffering a malfunction, in that area.
3. The access network in the area is preferably reserved for a certain time for the usage of certain users. For example, it might be desirable to exclusively reserve access to a certain access network to UEs related to emergency or security services in an area where a disaster has occurred, in an area where an special event takes place, etc.

4. The UE 1001 is moving so fast that handover procedures with respect to the concerned access networks are likely not to be completed successfully.

In all of these examples known systems experience the problem of a UE 1001 not being connected to an Access Network for a period of time whilst a new Access Network is found and connected to.

The failure to provide a seamless network connection is a serious problem for the user of the UE 1001 since it results in an unacceptable degradation in performance.

It is an object of the present invention to overcome the above described problem of a moving UE 1001 losing the service(s) it has when connected to a given access network.

SUMMARY

According to the present invention, there is provided an access network connection controller operable to control the switching of a connection between a mobile terminal to a first access network and the mobile terminal to a second access network, the access network connection controller comprising: a receiver operable to receive movement information representative of the movement of the mobile terminal connected to the first access network; an approach detector operable to determine from the movement information whether the mobile terminal is approaching a predetermined area wherein service of the first access network will be restricted and connection to a second access network will be beneficial; and a switching controller operable, in response to a determination by the approach detector that the mobile terminal is approaching a predetermined area, to generate a command ordering the switching of the connection of the mobile terminal from the first access network to the second access network before the mobile terminal enters the predetermined area.

The present invention also provides a network node for a mobile communications network, the network node comprising: a receiver operable to receive a command from an access network connection controller identifying a mobile terminal and an access network to which the mobile terminal should switch from its current access network; an order generator operable to generate an order containing information identifying the access network to which the mobile terminal should switch together with an indication that the order is for immediate execution by the mobile terminal; and a transmitter operable to send the generated order to the mobile terminal.

The present invention also provides a mobile terminal operable in response to an order from a network node to switch between a connection to a first access network and a connection to a second access network, the mobile terminal comprising: a receiver operable to receive an order from the network node ordering the switching of the connection of the mobile terminal from the first access network to the second access network, when the mobile terminal is approaching a predetermined area wherein service of the first access network will be restricted and connection to a second access network will be beneficial, before the mobile terminal enters the predetermined area, wherein the order contains an indication that it is for immediate execution; and an order processor operable to process the received order to identify the indication that the order is for immediate execution and to execute the order overriding any manual mode of the mobile terminal so as to switch the access network to which the mobile terminal is connected.

The present invention also provides a method of controlling the switching of a connection between a mobile terminal to a first access network and the mobile terminal to a second access network, the method comprising: receiving movement information representative of the movement of the mobile terminal connected to the first access network; determining from the movement information whether the mobile terminal is approaching a restricted area wherein service of the first access network may be restricted and connection to a second access network may be beneficial; and generating, in response to a determination that the mobile terminal is approaching a restricted area, a command ordering the switching of the connection of the mobile terminal from the first access network to the second access network before the mobile terminal enters the predetermined area.

The present invention also provides a method of operating a node in a mobile communications network, the method comprising the processes of: receiving a command identifying a mobile terminal and an access network to which the mobile terminal should switch from its current access network; generating an order containing information identifying the access network to which the mobile terminal should switch together with an indication that the order is for immediate execution by the mobile terminal; and sending the generated order to the mobile terminal.

The present invention further provides a method of operating a mobile terminal to switch between a connection to a first access network and a connection to a second access network, the method comprising the processes of: receiving an order from a network node ordering the switching of the connection of the mobile terminal from the first access network to the second access network, when the mobile terminal is approaching a restricted area wherein service of the first access network will be restricted and connection to a second access network will be beneficial, before the mobile terminal enters the restricted area, wherein the order contains an indication that it is for immediate execution; processing the received order to identify the indication that the order is for immediate execution; and executing the order overriding any manual mode of the mobile terminal so as to switch the access network to which the mobile terminal is connected.

In accordance with these features, upon determining that a moving UE is approaching a restricted area, the UE is ordered to change its current access network before entering said area.

By providing an order to the UE to switch access networks in advance of entering the restricted area, the probability of the UE losing availability for new incoming and/or outgoing communications, and/or the probability of the UE losing already established communications with other party/ies (e.g. due to a predictable unsuccessful, or undesired, roaming or handover), is reduced. Also, network resources can be better managed with regard to access networks that suffer malfunctions or congestions, or to which access is preferably reserved to certain users.

LIST OF FIGURES

ABBREVIATIONS

Figure 1:
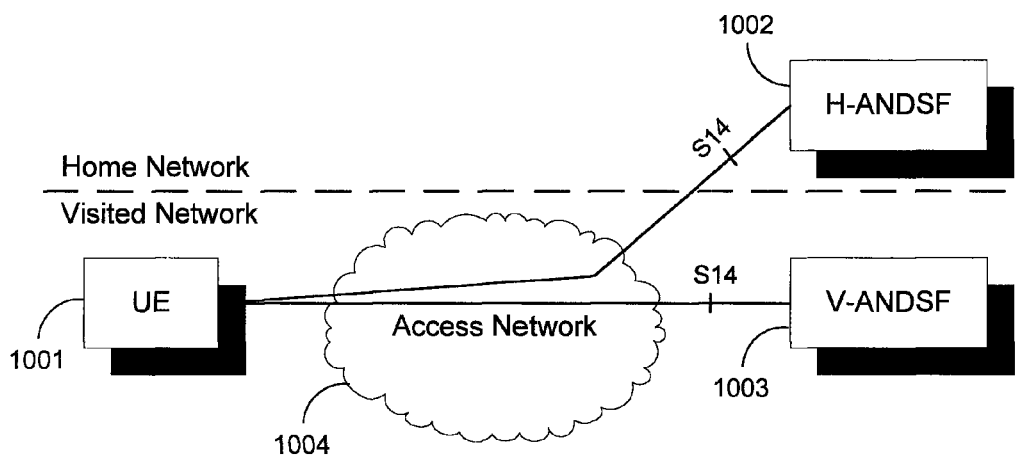
FIG. 1 shows the architecture of a known system in which a UE is connected to an ANDSF.
Figure 2:
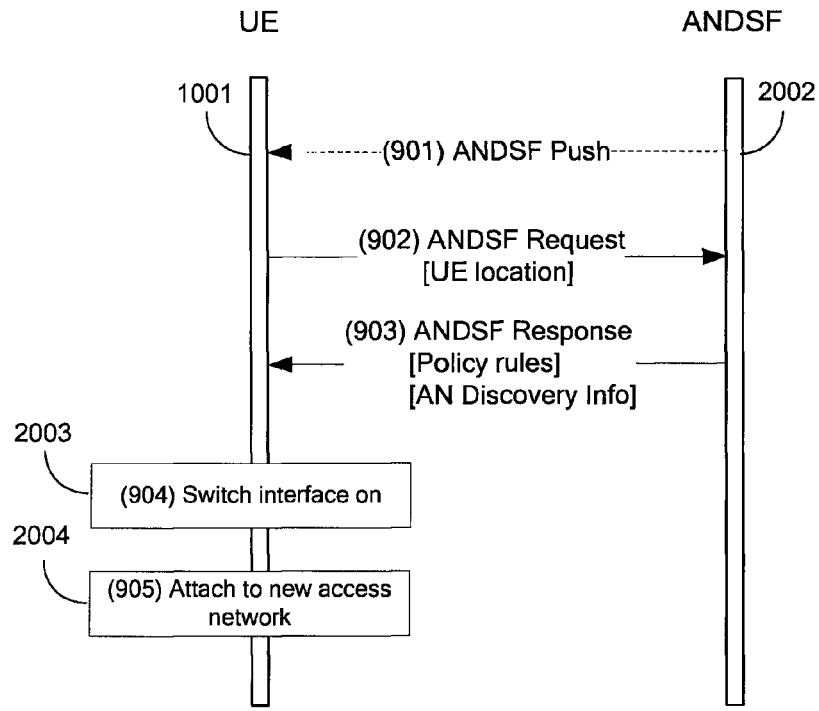
FIG. 2 shows high level generic interaction flow between a UE and an ANDSF in a known system.
Figure 3:
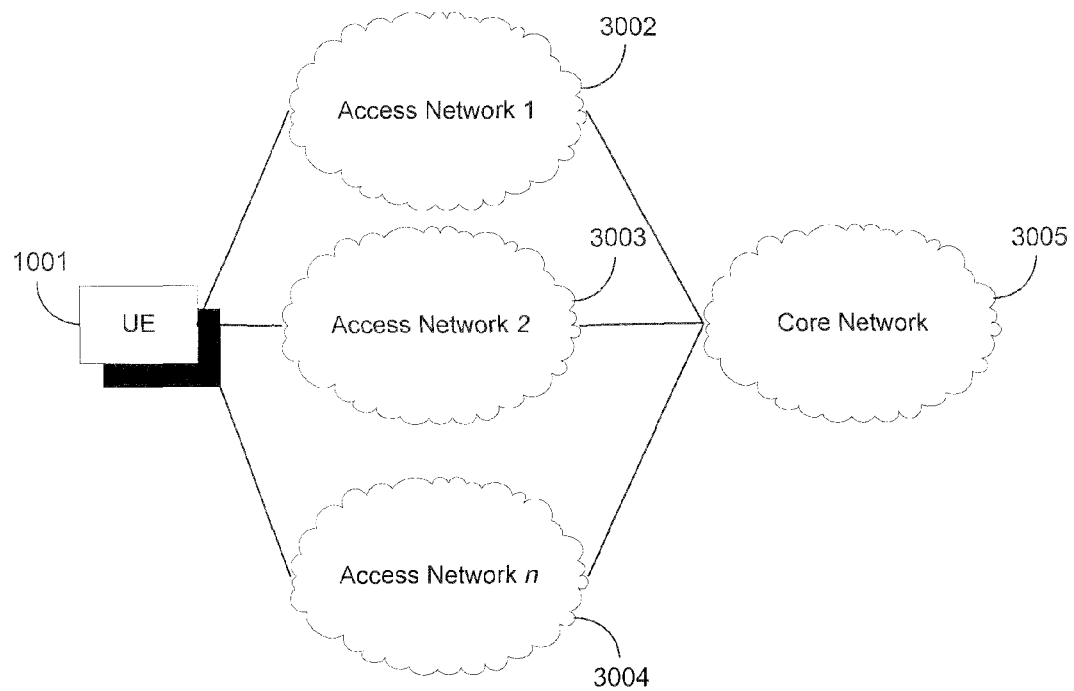
FIG. 3 shows a known arrangement of a UE connected to a core network via access networks.
Figure 4:
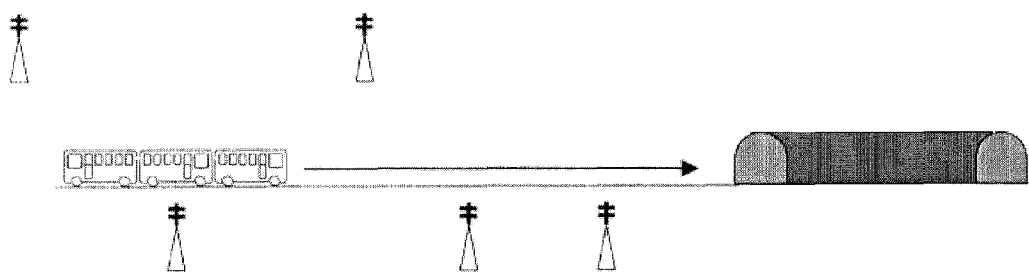
FIG. 4 shows a scenario in which a moving vehicle is approaching a tunnel.
Figure 5:
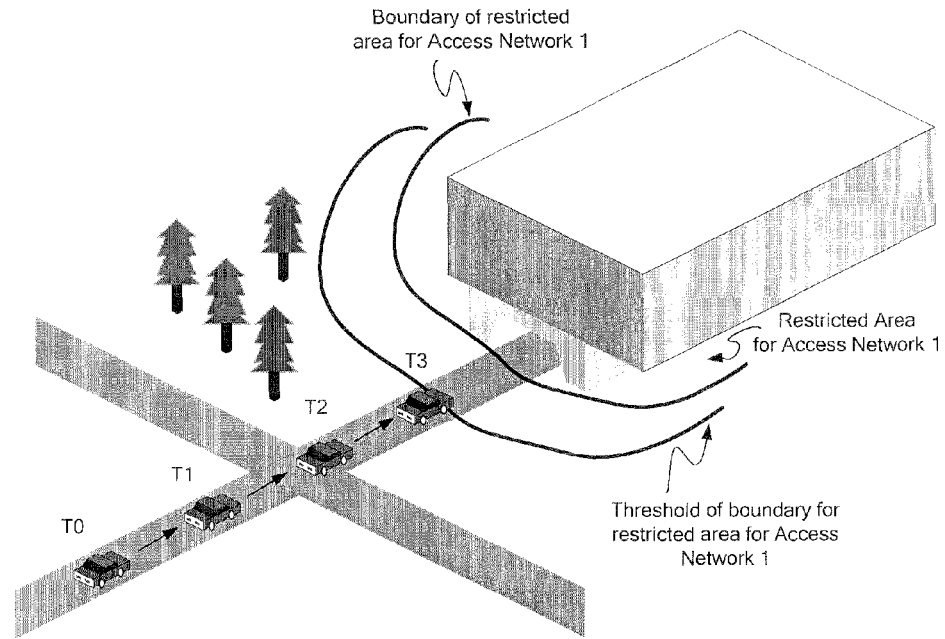
FIG. 5 shows a region in which an access network provides coverage, a restricted area in which the access network does not provide coverage and a threshold associated with the boundary of the restricted area. A moving vehicle comprising a UE communicating with the access network is shown approaching the restricted area.

3GPP Third Generation Partnership Project
ANDSF Access Network Discovery and Selection Function
AVP Attribute-Value Pair
DM Device Management
GAA Generic Authentication Architecture
GERAN GSM Existing Radio Access Network
GMLC Gateway Mobile Location Center
GPS Global Positioning System
H-ANDSF Home ANDSF
HTTPS Hypertext Transfer Protocol Secure
IMEI International Mobile Equipment Identity
IMS IP Multimedia Subsystem
IP Internet Protocol
LBS Location Based Services
OMA Open Mobile Alliance
MSISDN Mobile Subscriber ISDN Number
PANS Pre-emptive Access Network Switch
PS Presence Server
SMS Short Message System
UE User Equipment
V-ANDSF Visited ANDSF
WCDMA Wideband Code Division Multiple Access
WiMAX Worldwide Interoperability for Microwave Access
WLAN Wireless Local Access Network
XML Extensible Mark-up Language

[Description of Embodiments]

Prior to describing embodiments of the invention, some of the terms used in the description will be explained:

Restricted area for an access network is a geographical area where, either: communications of mobile or fixed devices through that access network cannot be granted, or are not desired; under a network perspective. For example, a restricted area might be determined due to the said access network not providing coverage, being congested, or reserved (e.g. in a certain time) for usage to only privileged users.

Boundary of restricted area: the geographical location and extension of a restricted area (e.g. geographical data about a set of points delimiting said area).

Threshold of boundary of restricted area: a strip area that surrounds the boundary of the restricted area. The width of this strip area need not be constant along the boundary of restricted area. The width of the threshold of boundary of restricted area can be widened or narrowed depending on operator's requirements, status of the resources associated to the access network(s) available in said area, and/or other factors, such as the speed of the UE.

Path: a successive series of positions relative to the location of a mobile user equipment.

By way of overview, in an embodiment of the invention, a new type of network node is defined.

The node is an access network connection controller and is referred to herein as a Pre-emptive Access Network Switch (PANS) 6008.

Throughout the present document the terms PANS and access network connection controller are interchangeable.

PANS 6008 is operable to acquire locations or other movement information of the UE (either from the UE itself or from another node in the network which has this information available) and, based on the collected information, create trajectory paths of the UE, predict a future trajectory of the UE, determine when the UE is approaching a restricted area for the current access network to which the UE is connected, and generate a command to switch the UE to a different access network prior to the UE traversing the boundary of the restricted area for the current access network.

It should be noted that switching by the UE from a first access network to a different (second) access network requires the UE to request access to said different (second) network, but does not necessarily imply the UE deactivating its connection to the first access network.

Acquiring movement information of a UE can comprise collecting information defining a set of successive positions related to the UE. The information can be reported by the UE itself to a network node, or collected by the PANS from one or more network nodes. Therefore, the PANS can, from a certain set of location (positioning) information collected in relationship to a certain UE, determine a path along which the UE is moving, or infer such a path (e.g. one or more of the collected locations coincides with geographical information-held or accessible to the PANS—that determines that the UE is moving along a certain highway or a certain railway); which allows the PANS to determine a future position of the UE and, in particular, that the UE is approaching a certain (restricted) area.

In one embodiment, PANS sends the command to an ANDSF network element, which then generates and sends an order to the UE for immediate execution by the UE to switch the UE from its current access to the different access networks.

By providing the switching order to the UE in advance of the UE entering the restricted area, the possibility of the UE of losing communication ability is reduced. For example, the possibility of the UE losing the availability of making/receiving new communications while moving, and/or the possibility of the UE losing already established communications with other party/ies while moving, is reduced.

In more detail, the purpose of PANS is:

To monitor at successive times movement information, such as network positioning information, of the LIE. Such positioning information can be determined roughly or in a more accurate way. The time interval for obtaining successive positioning information of a UE can vary (e.g. depending on the inferred speed and/or its proximity to a certain area).

To determine whether the UE is moving or not by processing the movement information, for example by comparing the sampled positions of the UE at different timestamps.

In case the UE is moving, to determine the trajectory of the path the UE is following.

To create a trajectory path from the acquired movement data (for example successive locations of the UE so far) and to predict, by extrapolating from the acquired data, future positions and a trajectory (of the UE) that passes through said future positions.

To monitor the access network used by the UE in a certain area and the existence of alternative access networks in that area, or close to it.

To determine, based on the trajectory of the UE, whether the UE is approaching a restricted area of that current access network (e.g., an area where there is no coverage due to a tunnel, congested network, an area reserved to certain users due to emergency services, etc.), where the area is covered by at least an alternative access network, or to determine that the UE is moving so fast that a disruption in the service due to a failed handover is very likely to occur.

In case the predicted trajectory of the UE traverses a threshold of the boundary of the restricted area for a first access network, prior to the UE reaching the boundary for restricted for that first access network, the PANS decides a set of prioritized alternate access networks with coverage in the geographical area where the UE is located, and orders the UE (e.g. via an ANDSF) to switch to a second access network. The second access network may be one of many possible access networks that do not have a restricted area in the geographical area where the UE is located. The order received by the UE is differentiated from regular advice provided by the ANDSF. This allows the order to override a manual setting that would otherwise require user consent to access an alternative access network.

To realise the above functionality, the PANS 6008 may also obtain and use static data related to a UE, such as profile information of the user, i.e. subscriber, of the UE, or capabilities of the UE with regard to access network types that are available.

Figure 6:
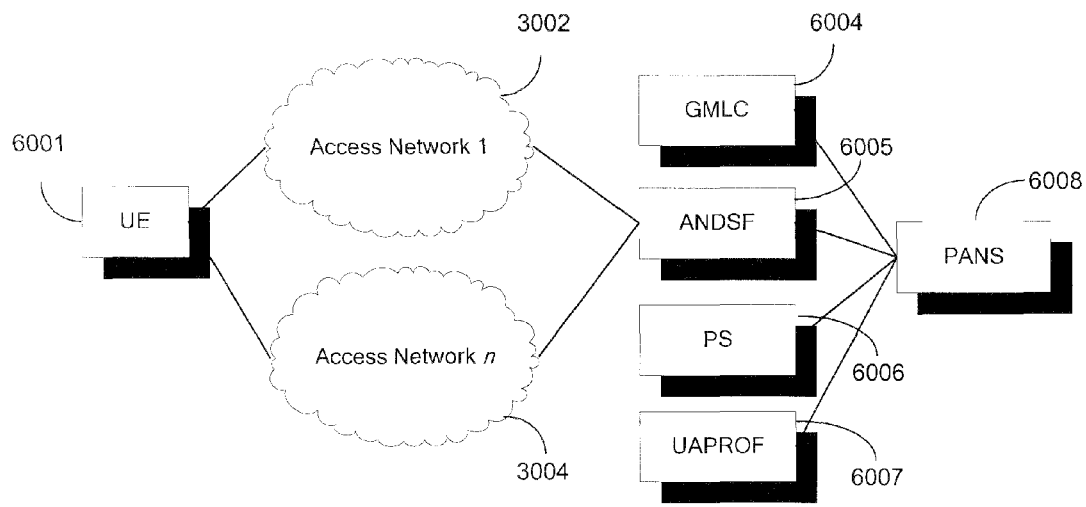
FIG. 6 shows a general network architecture according to an embodiment of the invention.

A general architecture illustrating embodiments of the invention is depicted in FIG. 6.

The wireless network shown in FIG. 6 comprises: a UE 6001, Access Network 1, 3002, Access Network n, 3004, and the following nodes: Gateway Mobile Location Centre (GMLC) 6004, Access Network Discovery and Selection Function (ANDSF) network element 6005, Presence Server (PS) 6006 User Agent Profile Server (UAProf) 6007, and Pre-emptive Access Network Switch (PANS) 6008.

As shown in FIG. 6, the UE 6001 is able to connect to Access Networks 1 and n. The UE 6001 may also be able to connect to more access networks, however, for clarity, these are not shown in FIG. 6.

Access Networks 1 and n are connected to, or are able to connect to, the ANDSF network element 6005.

The ANDSF 6005 is connected to, or is able to connect to, the PANS 6008.

The PANS 6008 is connected to, or is able to connect to, the GMLC 6004, ANDSF 6005, PS 6006 and UAProf 6007 network elements.

Figure 7:
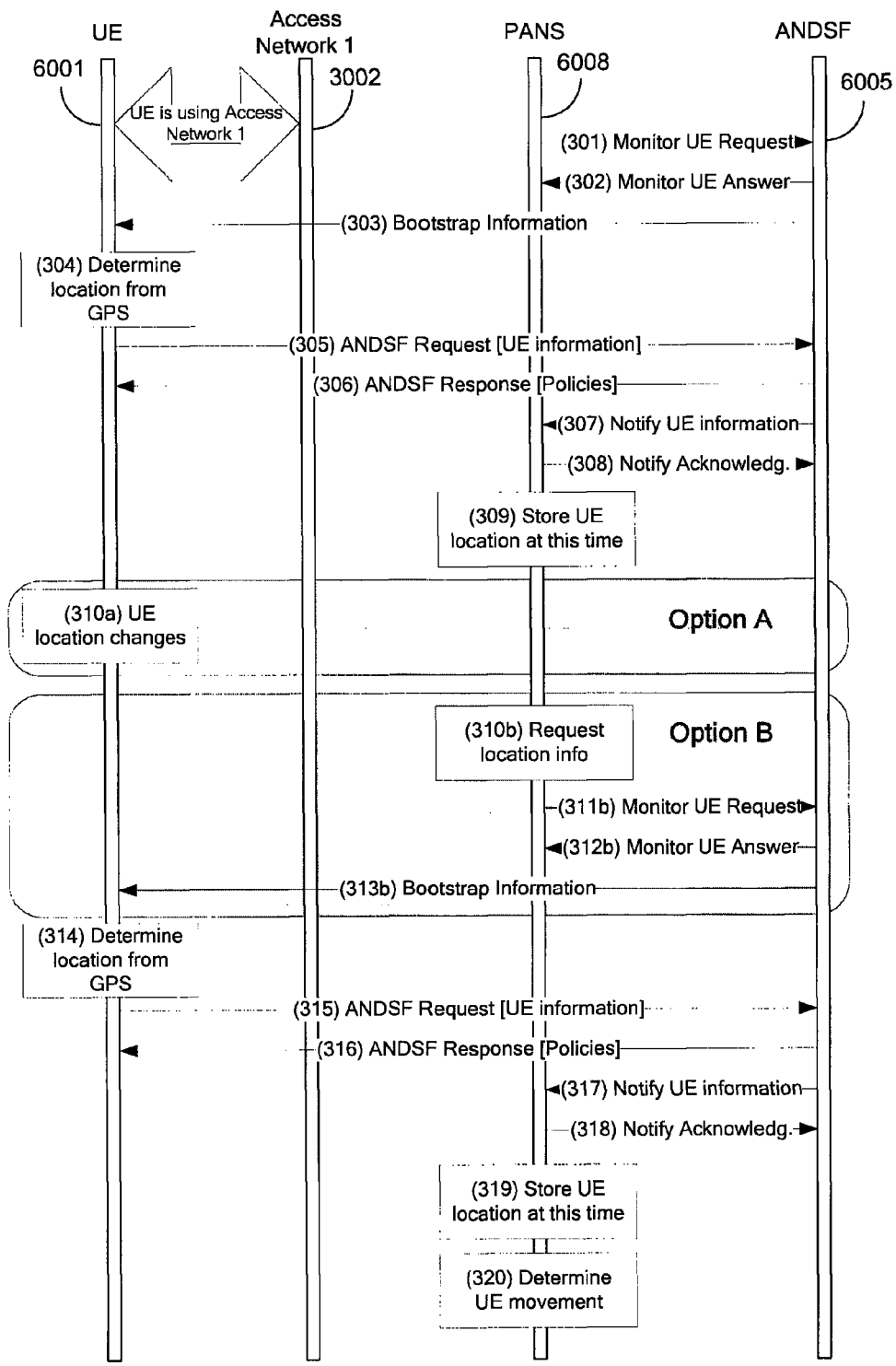
FIGS. 7 and 8 show a flow diagram that indicates the communication between a UE and nodes of a wireless network according to an embodiment of the invention.
Figure 8:
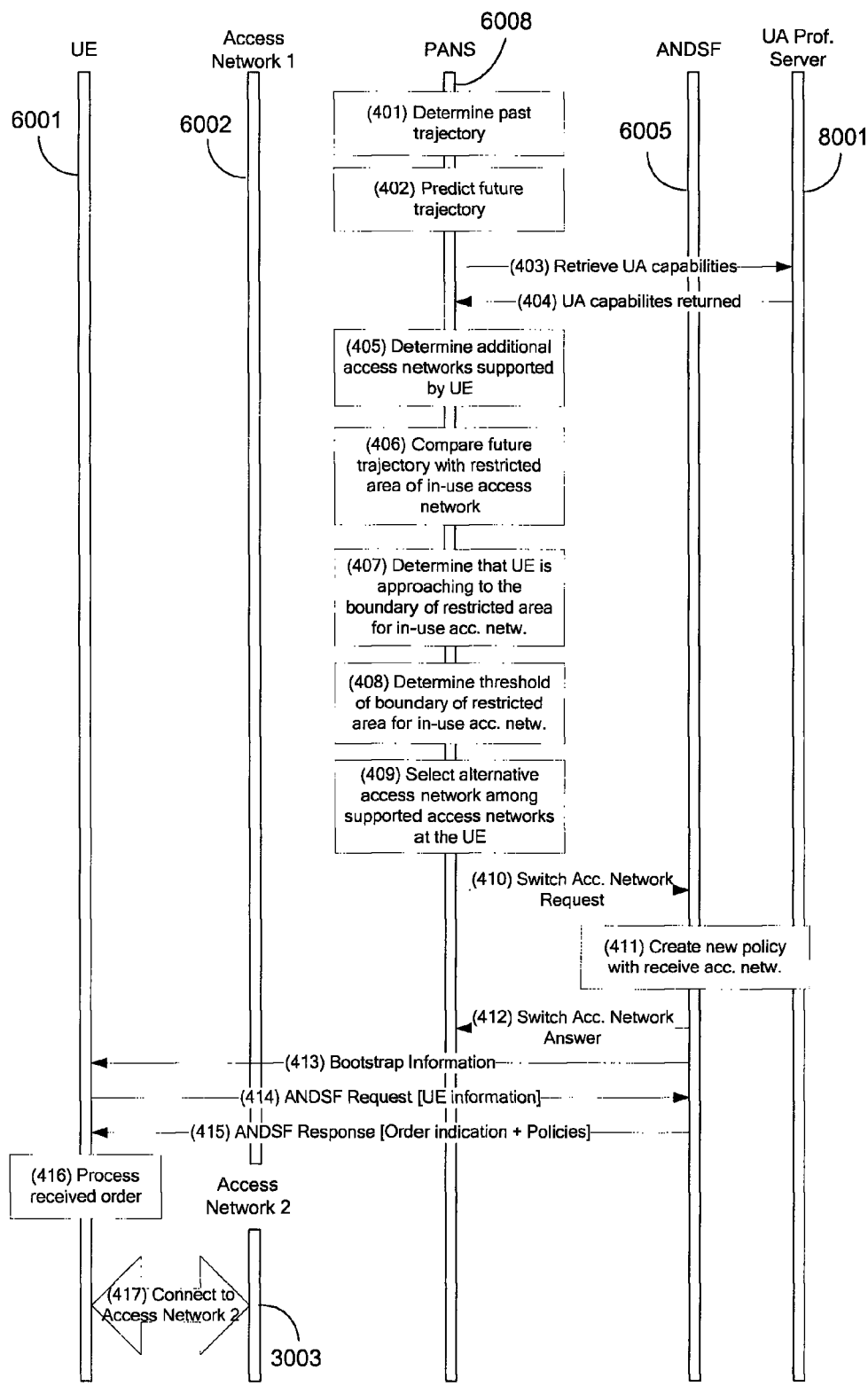

A simplified signalling flow illustrating communication steps in the present embodiment, with reference to the nodes, is shown in FIGS. 7 and 8.

FIGS. 7 and 8 illustrate an embodiment in which the location of the UE 6001 is determined with the help of a GPS or an Assisted GPS system, and in which the UE 6001 provides the location information to the ANDSF node 6005, and the ANDSF node later on provides the location information to the PANS node 6008.

The skilled person would appreciate that any satellite based system could be used to determine the location of the UE 6001 and in further embodiments of the invention, alternative mechanisms for the PANS 6008 to acquire the UE location information are utilised. These mechanisms can comprise the UE sending to a node in the network (rough) location information containing e.g.: Tracking Area Code, Location Area Code, Cell Identity of a 3GPP access network, or SSID of a WLAN access network; and the PANS receiving such information, or the PANS acquiring such a kind of information from one or more network nodes.

Referring to FIG. 7, it is assumed that a UE 6001 is already using a first access network, namely Access Network 1.

The PANS 6008 decides to supervise a given UE 6001, and sends 301*a* Monitor UE Request message to the ANDSF 6005, in order to be informed of UE information, such as UE location, used access network, and, if available, UE capabilities.

The ANDSF 6005 acknowledges 302 with a Monitor UE Answer response and sends 303 a Bootstrap information message to the UE 6001, this message containing a URL where the UE needs to post its UE information. The UE information can include location information, used and/or available access networks, UE capabilities (e.g. with regard to type of access networks that can be used), etc.

The UE 6001 determines 304 its geographical information with the help of GPS or Assisted GPRS and sends 305 an ANDSF request message that includes the UE location, used access network, UE capabilities, etc.

The ANDSF 6005 replies 306 to the UE 6001 with an ANDSF Response message, which may contain policy information with respect to access network selection. At this point in time, the policy information does not suggest a change of the current access network; the information is there merely for completeness with the existing protocol.

The ANDSF 6005 informs 307 PANS 6008 with a Notify UE Information message that includes the UE location information, the currently used access network, the UE capabilities with respect to access networks, and other relevant information.

The PANS 6008 acknowledges 308 the reception of this information with a Notify acknowledgment message and stores 309 the current UE location for future usage.

Next, two alternatives are possible, herein referred to as Option A and Option B.

According to Option A, the UE 6001 changes 310*a* its location to a degree where it needs to notify the network, then it determines 314 its location from GPS or Assisted GPS and continues with the rest of the steps.

Alternatively, according to Option B, the PANS 6008 determines 310*b* that the UE location has not been updated for a predetermined duration of time and the PANS 6008 requests such information from the ANDSF 6005 in steps 311*b* and 312*b*, with steps 311*b* and 312*b* corresponding to steps 301 to 303, described above.

The ADNSF 6005 then sends 313*b* a bootstrap message which is similar to the one sent in step 303, for the purpose of requesting the UE 6001 to contact the ANDSF 6005 and inform the ANDSF 6005 of its location information.

The UE 6001 then determines 314 its location with the help of GPS or Assisted GPS, and the process continues with the rest of the steps.

The UE 6001 then sends 315 an ANDSF Request message that includes the UE 6001 new geographical location information, currently used access network, UE capabilities with respect to access networks, and other relevant information.

The ANDSF 6005 replies 316 with an ANDSF Response message, which may contain policy information with respect to access network selection. At this point in time, the policy information does not suggest a change of the current access network; the information is there merely for completeness with the existing protocol.

The ANDSF 6005 informs 317 the PANS 6008 with a Notify UE Information message that includes the new UE location information supplied by the UE 6001, the UE currently used access network, UE capabilities with respect to access networks, and other relevant information.

The PANS 6008 acknowledges 318 the reception of this information with a Notify acknowledgment message and stores 319 the current UE location for future usage.

The PANS 6008 then uses the consecutive location information stored in steps 309 and 319 to determine 320 by comparison whether the UE 6001 is moving.

The description of the embodiment is now made with reference to the flow diagram illustrated in FIG. 8.

The PANS 6008 determines 401 the past trajectory by taking into account all the past determined locations and time at which each determined location was sampled.

The PANS 6008 then evaluates the mean speed of movement and predicts 402 the future trajectory of the UE 6001 and the time at which the UE 6001 is expected to reach one or more relevant points on the predicted future trajectory.

If the PANS 6008 does not have information with respect to the access network types and frequencies implemented in the UE 6001, the PANS 6008 contacts 403 a UA Profile server 8001 to acquire the list of one or more access networks implemented in the model of UE, message 404.

The PANS 6008 is now able to determine 405 which other access networks (other than the one in use) are currently supported by the type of UE 6001.

The PANS 6008 also compares 405 the currently used access network with the list of one or more available access networks that are supported by the UE 6001 and are able to provide access in the proximity of the UE.

The PANS 6008 also compares 406 the future trajectory of the UE 6001, determined in step 402, in order to determine the likelihood of the UE 6001 to enter a restricted area of the currently used access network.

The PANS 6008 then determines 407 whether the UE 6001 is approaching a boundary of restricted area of the currently used access network and then determines 408 the threshold of boundary of restricted area for the currently used access network.

The PANS 6008 then selects 409 an alternative access network from those available in the proximity of the UE 6001 and supported by the UE.

The PANS 6008 then, preferably prior to the UE 6001 reaching the threshold of the boundary of the restricted area of its current access network, e.g. according to a time determined by the predicted trajectory data, or by said determined time, transmits 410 a command in the form of a Switch Access Network Request message to the ANDSF 6005 indicating the selected access network to which the UE 6001 should switch.

The ANDSF 6005 stores the identifier of the new access network and creates 411*a* new intersystem mobility policy that contains this second access network as the highest priority access network. The intersystem mobility policy contains an indication that indicates to the UE 6001 that the policy contains an order with a high priority of execution in order for the UE to avoid losing its communication services. The order therefore comprises an indication that, upon being received by a UE 6001, the order is to be executed immediately. The ANDSF 6005 stores the intersystem mobility policy for future use.

The ANDSF 6005 acknowledges the reception of message 410 with a Switch Access Network Answer message 412 and sends a Bootstrap Information message 413 with an indication of how to download the new policy. The UE 6001 sends an ANDSF request message 414 that includes its current location information, UE capabilities, etc.

The ANDSF 6005 then sends an ANDSF response message 415 containing the policy created and stored at step 411, together with the indication that this is an order of immediate execution. The order indication allows the UE 6001 to differentiate the message from regular policies, which may contain non-critical information (e.g., a suggestion or advice) from critical information contained in the present message. The UE 6001 may allow orders received from the ANDSF 6005 to override the manual mode, so, even if the UE 6001 is configured in manual mode, policies received from the ANDSF 6005 will immediately execute and trigger a change in the access network.

Upon reception of the ANDSF response message 415, the UE processes 416 the received order and new policy. Since the message 415 contains an indication of a critical order, the UE 6001 executes the change of the access network as soon as possible.

Therefore, the UE 6001 attaches 417 to the new access network in accordance with the order, even if this results in changing the connection to an access network that currently provides worse reception and performance.

Once the attachment is successfully completed, the UE 6001 may change its current existing IP flows, if any, to the new access network.

As will be understood from the description above, the PANS node 6008 in the present embodiment interfaces the following existing nodes:

Access Network Discovery and Selection Function (ANDSF). The ANDSF node 6005 is able to:
  receive the location information of the UE 6001;
  send the UE policy rules for switching to alternative access network; and
  provide the discovery information of those access networks.
The PANS 6008 interfaces the ANDSF 6005 for two different purposes:
  1. To retrieve UE location information (e.g. either, by a explicit requests, or by subscribing to be notified about changes in said information).
  2. To provide real-time orders to the UE 6001 to switch to an alternative access network.
Gateway Mobile Location Center (GMLC) 6004. The GMLC 6004 is able to acquire UE location information and offer it to location based clients. PANS 6008 is effectively a location based services client that retrieves the UE location from the GMLC 6004.

Presence Server (PS) 6006. A UE 6001 is able to embed location information as part of the user's presence status and sent it to a presence server 6006. PANS 6008 implements a presence client that subscribes to the at least location information embedded in the presence information stored in the PS 6006.

User Agent Profile server (UAProf) 6007. PANS 6008 may interface a User Agent Profile server 6007 in order to get the UE capabilities, in particular, the type of access networks supported by the UE 6001, the range of supported frequencies, etc.

Note that the PANS 6008 deals with switching from a first access network to a second access network. The PANS does not affect the existing mobility mechanisms within the same access network, for example, handover mechanisms.

The functionality of PANS 6008 is now explained in greater detail.

Monitoring the Location of the UE

Three methods of the PANS 6008 acquiring location information are presented below. Other methods can be applied as well.

Figure 9:
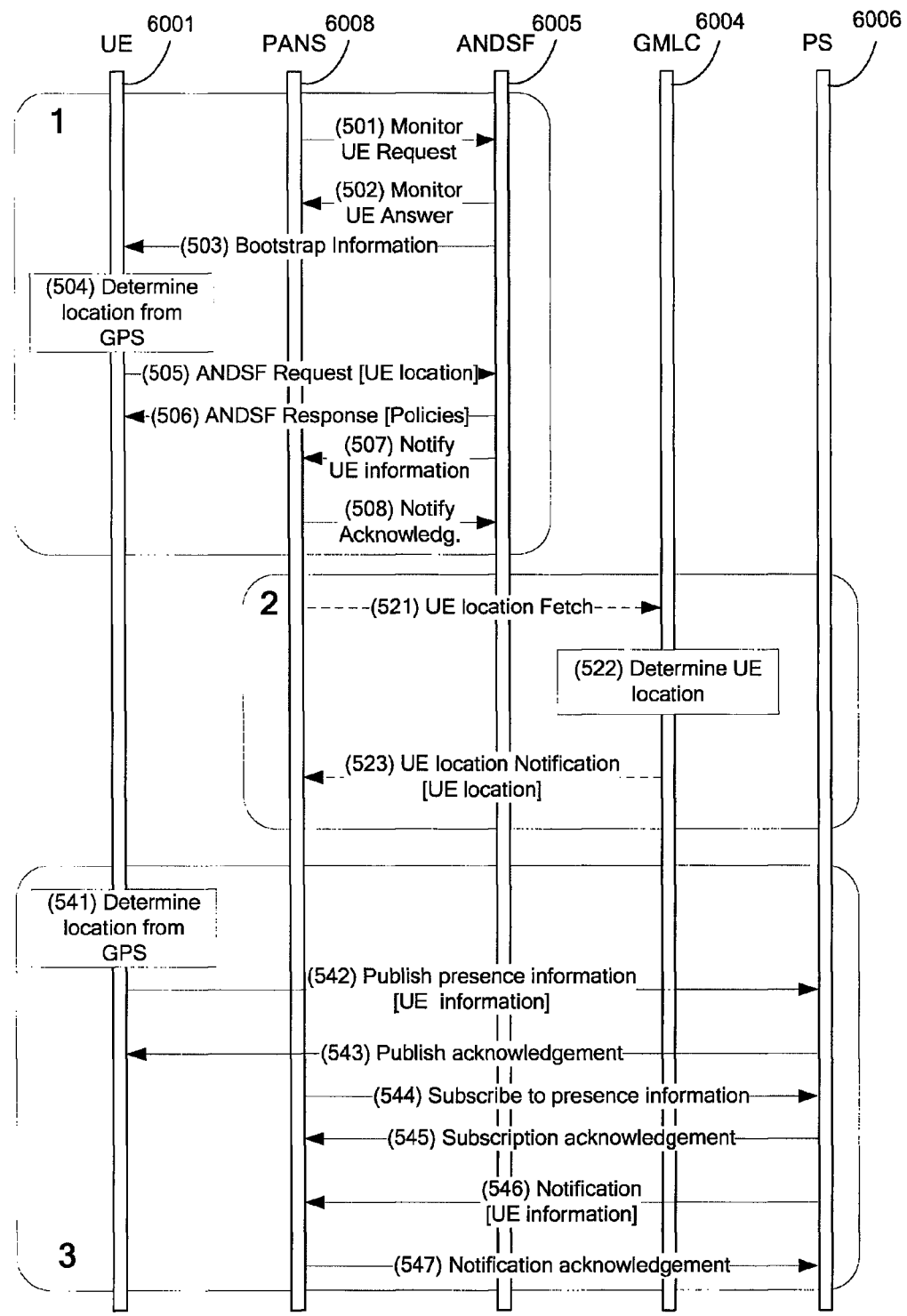
FIG. 9 shows three different methods by which a PANS can obtain the location information of a mobile terminal according to embodiments of the invention.

FIG. 9 describes three possible ways at the PANS' disposal for acquiring location information:

1. The PANS 6008 requests in message 501 the ANDSF to monitor all possible information of a given UE, including but not restricting to, the UE's location information. The ANDSF 6005 acknowledges 502 the request and sends 503 a bootstrap message to prompt the UE 6001 to send its location information.

The UE 6001 determines 504 the location information, preferably with the help of a GPS or Assisted GPS, if the UE 6001 is equipped with a GPS receiver, or some sort of rough location composed of the Tracking Area Code, Location Area Code, and Cell Identity of a 3GPP access network.

The UE 6001 sends 505 its location information to the ANDSF 6005 via standard procedures at the time it requests intersystem mobility policies.

The PANS 6008 sends the requested policies 506, which at this stage do not require a change in the UE's access network.

The PANS 6008 is preferably notified 507 from the ANDSF 6005 with the UE's information, including location information and current access network in use.

2. The PANS 6008 becomes a client of the Gateway Mobile Location Centre (GMLC) 6004. The GLMC 6004 provides the ability to locate and deliver the geographic location information of UE 6001.

The PANS 6008, acting as a client of Location Based Services, subscribes, not shown in FIG. 9, to the location of the UE 6001 at the GMLC 6004, or periodically polls the GMLC for retrieving 521 the UE's location information. The GMLC determines 522 the location of the UE and forwards 523 it back to the PANS.

The location information may be any of the following provided by the GMLC 6004: Tracking Area Code, Location Area Code, and Cell Identity (with optional TA) of a 3GPP access network.

3. A UE 6001 is equipped with a satellite based receiver, such as a GLONASS receiver, GPS receiver, or has Assisted GPS capabilities and is able to determine 504 its geographical location.

The UE 6001 uses the presence enabler of IMS to periodically publish, message 542, the UE's presence information to its presence server 6006, embedding its location information, profile information, and UE's capabilities.

The Presence Server 6006 acknowledges 543 the publication. The PANS 6008 acts as a watcher of this presence information, subscribing to the UE's presence information, message 544, or periodically polling the UE's location and profile information, not shown in FIG. 9. The PANS authorizes and acknowledges 445 the subscription.

Whenever necessary, for example when information has changed, the Presence Server notifies, message 546, the UE's available information to the PANS 6008, including location information, profile information, and UE's capabilities, for example, with respect to available access network types, either as a notification, message 546, or as an answer to the fetch operation, not shown in FIG. 9.

The PANS 6008 can monitor, or sample, the location of a UE 6001 at regular or variable time intervals. For example, the sampling speed can vary depending on the inferred speed of the UE and/or its proximity to a certain area. Each acquired location information can be stored for a certain duration of time (e.g., one hour).

Determining Whether the UE is Moving or not

For a given UE 6001, the PANS 6008 plots on a map, that is typically an electronic map, the current location of the UE 6001 at the sampled time. With this information, PANS 6008 is able to determine whether a UE 6001 is moving and its speed of movement.

The map need not necessary be a cartography map, but a set of well-known points by the network, for instance, the geographical coordinates of base stations which have connection with the UE 6001. If no geographical information is to be used at all, a linked list of base stations could be used.

The operator provisions a list of base stations in its network, or a part of its network, together with the distance between them.

Determining the Trajectory of the Path the UE is Following

In case the UE 6001 is moving, the PANS 6008 is able to determine the past trajectory of the UE.

Furthermore, the PANS 6008 determines if the past trajectory of the UE 6001 has taken place over an existing road, highway, railway track, or air corridor. By using a simple projection of the past trajectory over the path, and by using data corresponding to the past speed, the PANS is able to predict the future trajectory of the UE and time at which the UE will be at different positions on that predicted trajectory.

Monitoring the Access Network in Used by the UE in that Area

The PANS 6008 has been provisioned with information that plots the geographical area covered by each access network offered by the operator. By correlating the current geographical position of the UE 6001 with that map, the PANS 6008 is able to determine which access networks are available at the current location of the UE 6001.

The PANS 6008 also acquires information related to the profile of the UE in order to determine the support that the device offers of other access networks. PANS 6008 can get this information by, e.g., inspecting the IMEI code (which determines the manufacturer and type of device), or by retrieving it from a Profile Repository by using OMA User Agent Profile (UAProf) information (OMA User Agent Profile V2.0, OMA-ERELD-UAProf-V2_0_1). In particular, the "NetworkCharacteristics" information element of the UAProf information stored in an UAProf server contains detailed information of the supported access networks by this type of UE. This is the most relevant information required by PANS from the UAProf server.

Determining Whether the UE is Approaching a Restricted Area

With the sequence of samples of the UE location, the PANS 6008 can predict whether the UE 6001 is moving along a highway, railway track, or similar. By inspecting the areas of coverage, the PANS can determine whether the UE 6001 is approaching the threshold of the boundary of restricted area, and can also determine a time at which the UE is expected to cross said threshold.

The restricted area to which this threshold pertains may be determined by an area where congestion statistically occurs in this access network at this time of the day and day of the week, an area where PANS 6008 has real-time information of current congestion conditions, an area where a ban is in place for the current access network (for example due to reservation for a group of users), etc. The PANS 6008 can also determine if another alternative access network is available on that restricted area along the path of movement.

The Threshold of the boundary of the restricted area that the UE is approaching can be set statically or can be determined dynamically by the PANS 6008 on a per UE case basis. For example, the threshold of the boundary can be set depending on the inferred speed of the UE 6001, and/or depending on a given speed, not necessarily calculated (for example based on processing information of subsequent positions of a UE obtained at subsequent times), but based on the UE's determined path (for example, if it coincides with high-speed train railways), or current position.

Accordingly, a first UE approaching a certain restricted area can be ordered to switch to another access network before a second UE, which, for example, is approaching the same restricted area and which might be even closer to the boundary of said area.

Therefore, the feature of adapting, in certain cases, the threshold to be considered for a restricted area (which determines ordering a UE to switch to another access network) with dynamic factors going beyond the theoretical radio coverage of an area helps to prevent handover failures.

Ordering the UE to Switch to Another Access Network

When the predicted trajectory of the UE 6001 traverses the threshold of the boundary of the restricted area, the PANS 6008 uses the ANDSF 6005 interface to order the UE 6001 to switch to an alternative access network prior to the UE 6001 reaching the boundary, so that the network switch is complete before the UE 6001 enters the restricted area.

The switching order can be provided by re-using and extending the ANDSF Device Management (DM) Managed Object (MO) information specified in 3GPP TS 24.312. The current ANDSF DM MO allows the network to provide policies to the UE to select among available access networks around the UE 6001. However, for better accomplishing the purpose of the present embodiment, the data transferred from the ANDSF to the UE, for example as defined in 3GPP TS 24.312, are preferably extended or modified to flag the new information as an order of immediate execution, prior to facing the risk of interruption of service, rather than as assistance data/policies. This will allow the UE to differentiate this (new) information from the current advice that a known ANDSF 6005 provides and, that otherwise, the UE could simply ignore or execute at a later time.

An example of one theoretical possible coding of such new information is a new leaf in the ANDSF DM MO, with the following characteristics:
Name: <X>/Policy/<X>/Reason
Format: chr
Access Types: Get, Replace
Values: network-blackout To enable this procedure, the PANS is also provided with a new interface to the ANDSF 6005, so that the ANDSF can receive the information from the PANS 6008 ordering explicitly a switching of access network to a certain UE and send it to said UE 6001.

New Interface Between PANS and ANDSF

The new interface between PANS 6008 and ANDSF 6005 is preferably implemented as a new Diameter application of the Diameter protocol specified in RFC 3588 IETF RFC 3588: Diameter base protocol, although any other protocol can be used.

Figure 10:
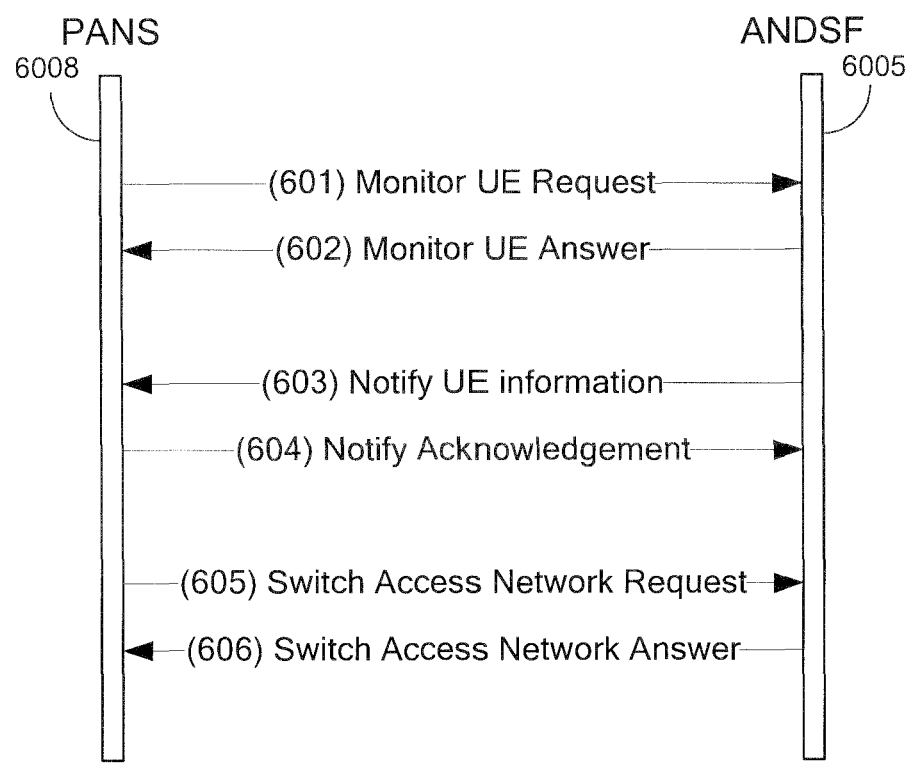
FIG. 10 shows example messages that are passed over the interface between a PANS and an ANDSF in an embodiment of the invention.

Referring to FIG. 10, the Diameter application is preferably implemented with at least three pairs of messages. The origin and destination of these messages are shown in FIG. 10.

The messages over the PANS-ANDSF interface are:

Monitor UE Request: The PANS 6008 requests the ANDSF 6005 to monitor all the UEs pertaining to a user associated with an MSISDN or IMS Public User Identity, in order to provide all the relevant information that the PANS may require should the PANS instruct the UE to switch to a second access network. PANS identifies the user by an MSISDN or IMS Public User Identity. AVPs included in this message include MSISDN AVP and IMS Public User Identity AVP. If a Monitor ID AVP is known, PANS includes a Monitor ID AVP.

Monitor UE Answer: The ANDSF 6005 acknowledges the reception of a Monitor UE Request message to the ANDSF. This message includes a Monitor ID AVP that contains an identifier to be used in subsequent exchange of messages pertaining to the same user and a Result Code AVP.

Notify UE Information: The ANDSF 6005 notifies the PANS UE information. The AVPs present in this message include Monitor ID, UE location information, for example geographical coordinates, Current Access Networks, Seen Access Networks, UE Capabilities, IMEI, Supported Access Networks, UE Profile Type.

Notify Acknowledgement: The PANS 6008 acknowledges the ANDSF the reception of a Notify UE Information message. The AVPs present in this message include Monitor ID and Result Code AVP.

Switch Access Network Request: The PANS 6008 requests the ANDSF to create an order to be sent to the UE to change to a new access network. The AVPs present in this message include: Monitor ID, New Access Network Information.

Switch Access Network Answer: The ANDSF 6005 acknowledges the PANS the reception of a Switch Access Network Request. The AVPs present in this message include: Monitor ID, Result code.

Figure 11:
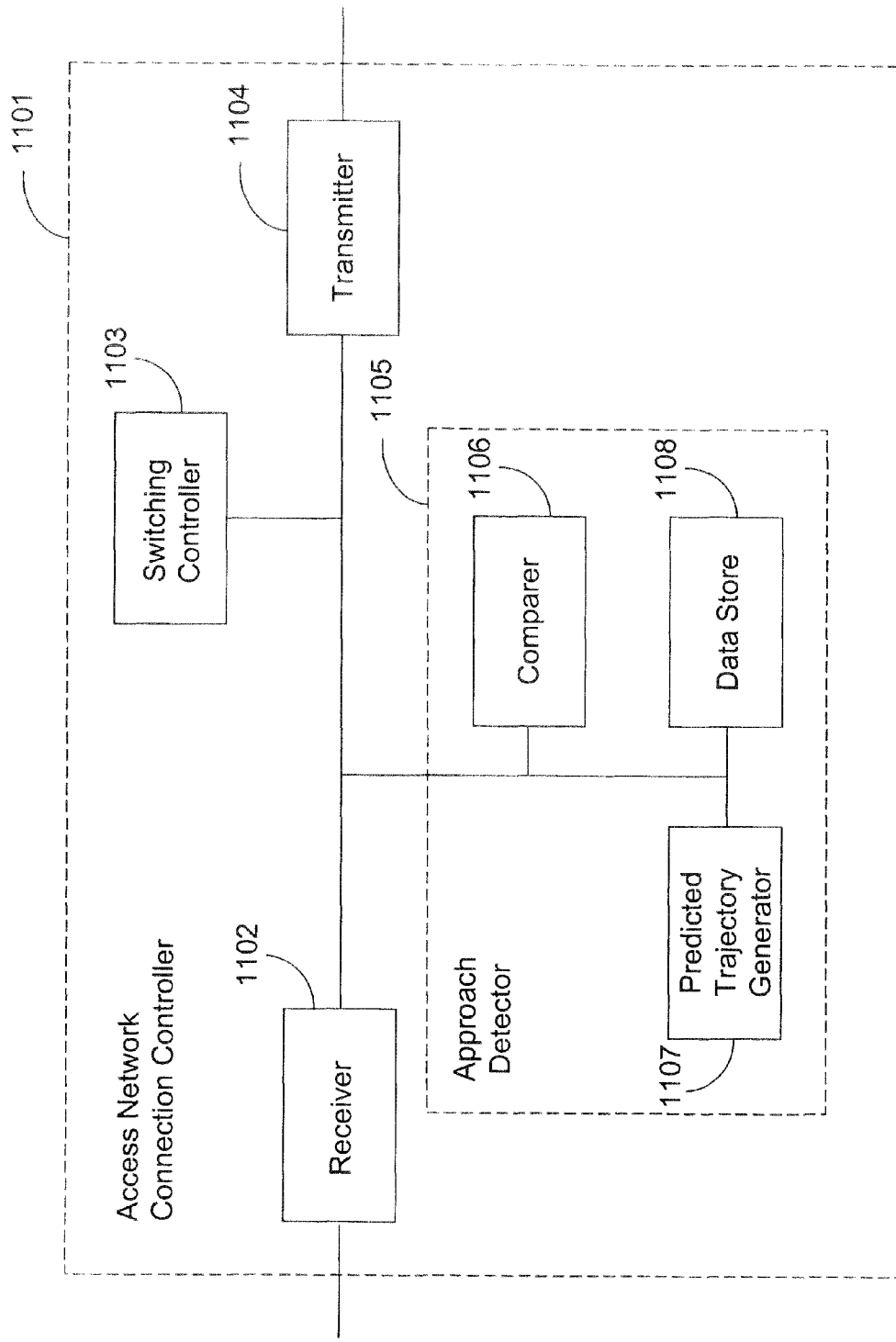
FIG. 11 shows a block diagram of an access network connection controller in accordance with an embodiment of the invention.

FIG. 11 shows a block diagram summarizing key components of an access network connection controller 1101, or PANS 6008, in accordance with an embodiment of the invention.

The access network connection controller 1101 controls the switching of a connection between a mobile terminal 6001 to a first access network and the mobile terminal to a second access network.

The access network connection controller 1101 comprises a receiver 1102 operable to receive movement information representative of the movement of the mobile terminal 6001 connected to the first access network. The receiver 1002 may be an antenna, or a wired input port and may additionally comprise a signal conditioning unit so that the received signal can be processed by the access network connection controller 1101.

An approach detector 1105 is operable to determine from the movement information whether the mobile terminal 6001 is approaching a restricted area wherein service of the first access network may be restricted and connection to a different, second access network may be beneficial.

In this embodiment, the approach detector 1105 comprises a predicted trajectory generator 1107 operable to generate data defining a predicted trajectory of the mobile terminal 6001 using the movement information (such as successive locations) obtained by the access network connection controller 1101, a data store 1108 storing data defining at least one, but typically a plurality, of restricted areas, and a comparer 1106 operable to compare the data defining the predicted trajectory with the data defining the restricted area(s) to determine if the mobile terminal 6001 is approaching a restricted area.

A switching controller 1103 is operable, in response to a determination by the approach detector 1105 that the mobile terminal 6001 is approaching a restricted area, to generate a command ordering the switching of the connection of the mobile terminal 6001 from the first access network to the second access network before the mobile terminal 6001 enters the restricted area.

A transmitter 1104 is operable to transmit the command generated by the switching controller 1103 to the ANDSF network element to cause this element to generate and send a switching order to the mobile terminal 6001.

The above-described approach detector 1105 and switching controller 1103 may be implemented by standard hardware components such as DSPs.

Figure 12:
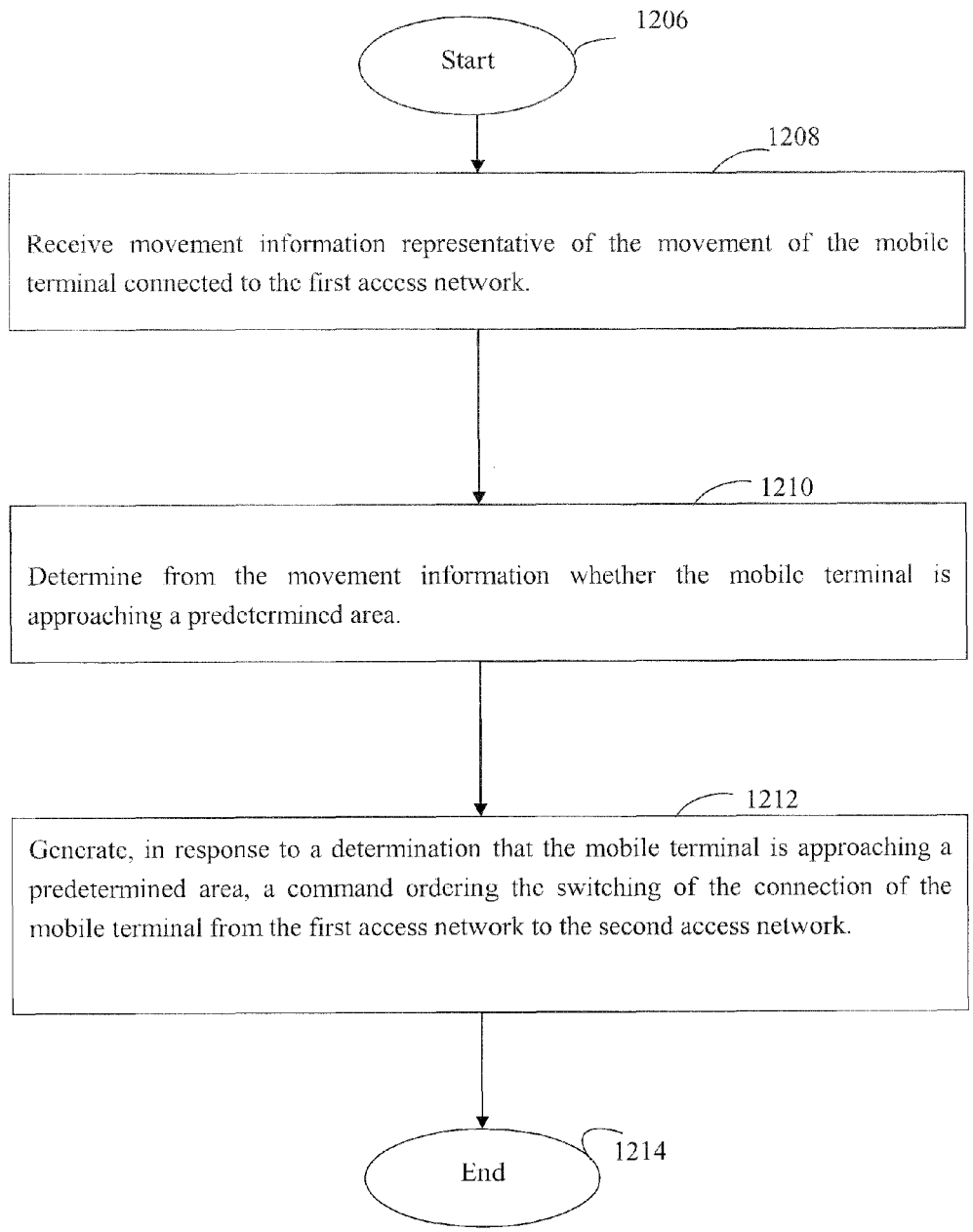
FIG. 12 is a flow chart summarising the key processes in a method of controlling the switching of a connection between the mobile terminal to a first access network and the mobile terminal to a second access network according to an embodiment of the invention.

FIG. 12 is a flow chart summarising the key processes in a method of controlling the switching of a connection between the mobile terminal 6001 to a first access network 3002 and the mobile terminal 6001 to a second access network 3003 according to an embodiment of the invention.

The method starts at 1206.

The method then proceeds to process 1208, at which movement information is received that is representative of the movement of the mobile terminal 6001 connected to the first access network 3002.

The method then proceeds to process 1210, at which a determination is made, from the movement information, whether the mobile terminal 6001 is approaching a predetermined (restricted) area.

The method then proceeds to process 1212, at which, in response to a determination that the mobile terminal 6001 is approaching a predetermined area, a command is generated ordering the switching of the connection of the mobile terminal 6001 from the first access network 3002 to the second access network 3003.

The method then proceeds to process 1214, at which it ends.

Figure 13:
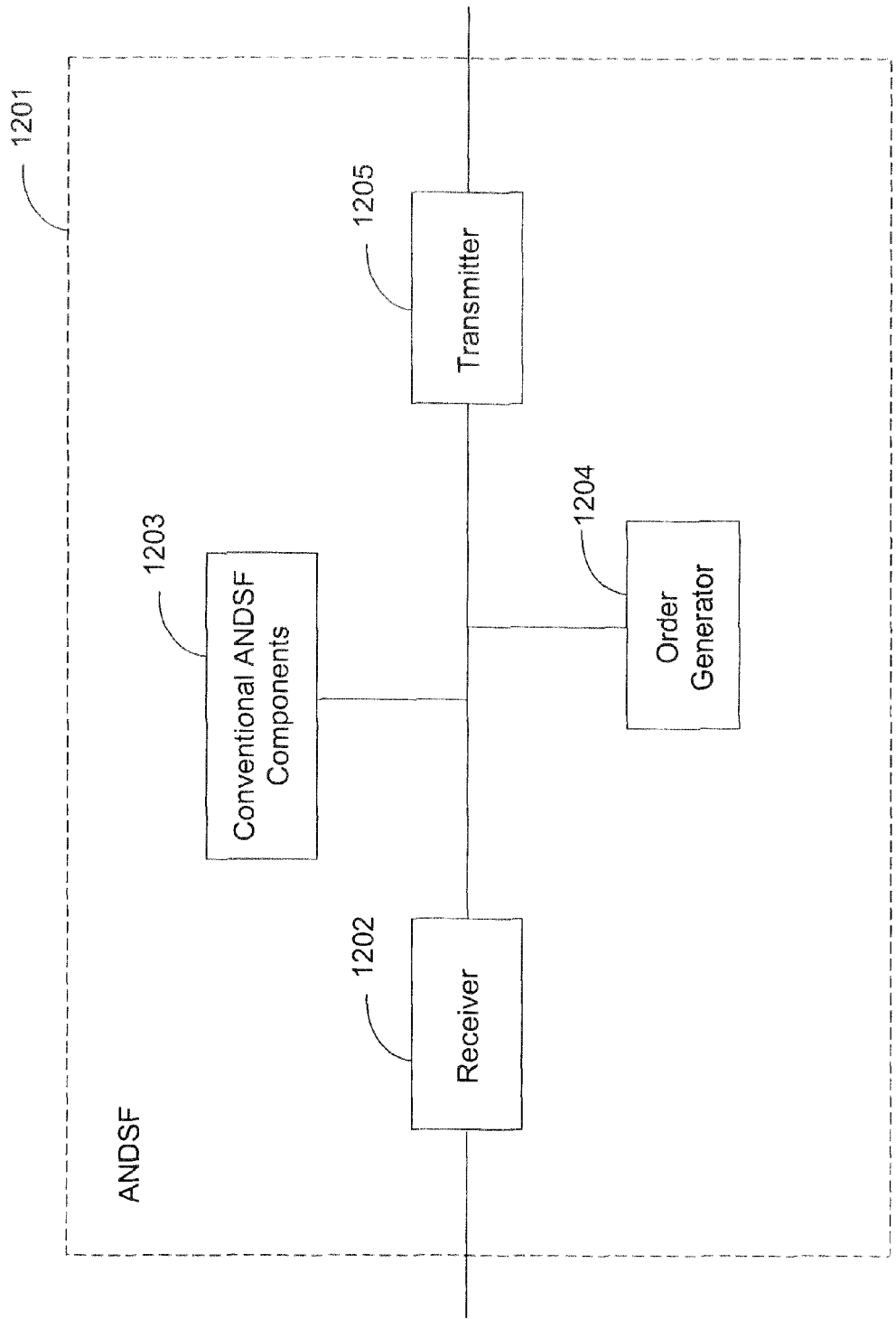
FIG. 13 shows a block diagram of an ANDSF in accordance with an embodiment of the invention.

FIG. 13 shows a block diagram summarizing key components of a network node, such as an ANDSF 1201, according to an embodiment of the invention.

The network node comprises a receiver 1202 operable to receive a command from an access network connection controller 1101 identifying a mobile terminal 6001 and an access network to which the mobile terminal should switch from its current access network. The receiver 1202 may be an antenna or input port of a wired connection.

An order generator 1204 is operable to generate an order containing information identifying the access network to which the mobile terminal 6001 should switch together with an indication that the order is for immediate execution by the mobile terminal.

The order generator 1204 may be implemented by a DSP or any other known hardware component.

A transmitter 1205 is operable to transmit the generated order to the mobile terminal 6001.

Figure 14:
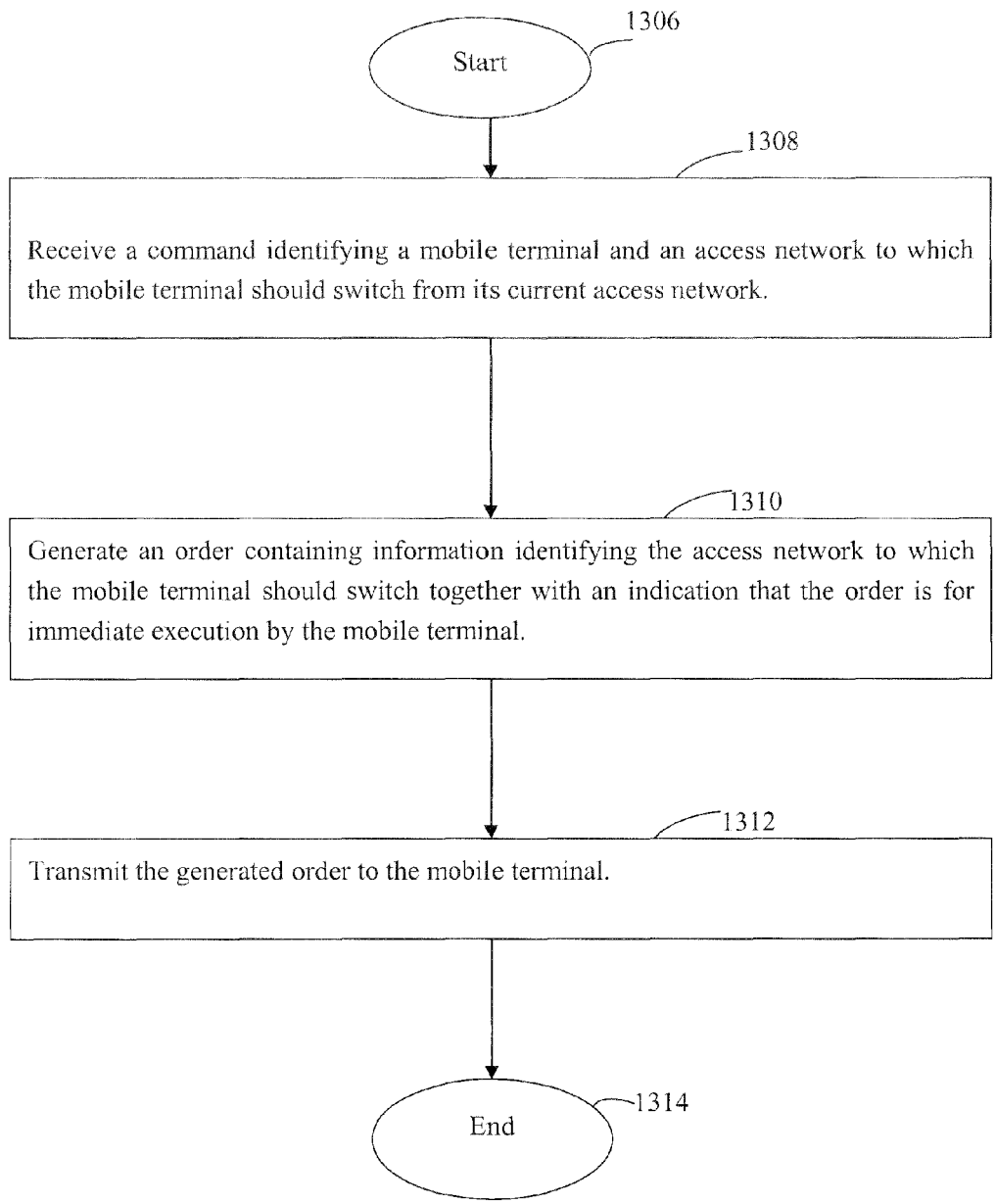
FIG. 14 is a flow chart summarising the key processes in a method of operating a network node in a mobile communication network according to an embodiment of the invention.

FIG. 14 is a flow chart summarising the key processes in a method of operating a network node in a mobile communication network according to an embodiment of the invention.

The method starts at 1306.

The method then proceeds to process 1308, at which a command is received by the network node that identifies a mobile terminal 6001 and an access network to which the mobile terminal 6001 should switch from its current access network.

The method then proceeds to process 1310, at which the network node generates an order that contains information identifying the access network to which the mobile terminal 6001 should switch together with an indication that the order is for immediate execution by the mobile terminal 6001.

The method then proceeds to process 1312, at which the generated order is transmitted by the network node to the mobile terminal 6001.

Figure 15:
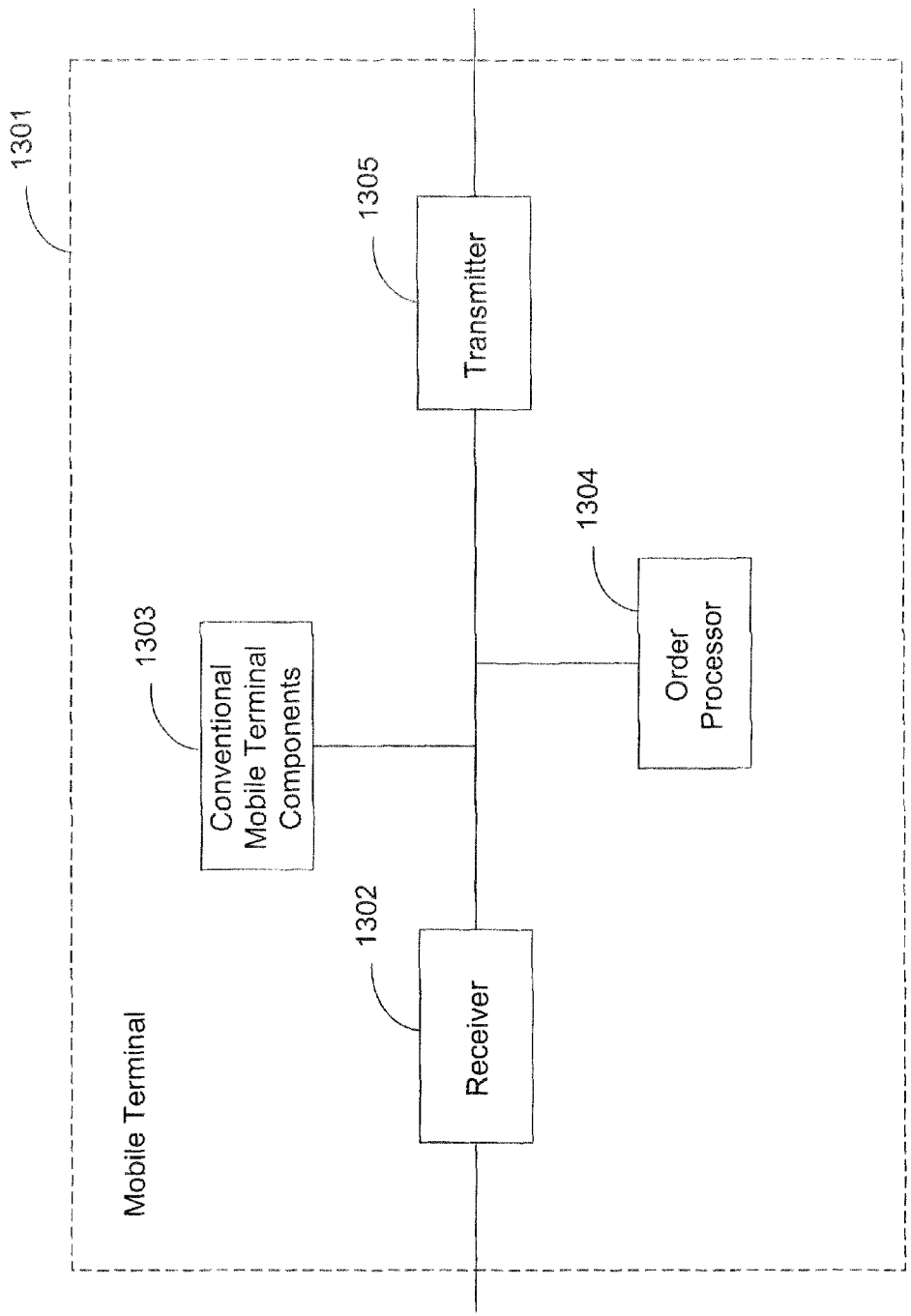
FIG. 15 shows a block diagram of a mobile terminal in accordance with an embodiment of the invention.

FIG. 15 shows a block diagram summarizing key components of a mobile terminal 1301 according to an embodiment of the invention.

A receiver 1302 is operable to receive an order from the network node ordering the switching of the connection of the mobile terminal 6001 from the first access network to the second access network, when the mobile terminal 6001 is approaching a restricted area wherein service of the first access network may be restricted and connection to a second access network may be beneficial, before the mobile terminal 6001 enters the restricted area, wherein the order contains an indication that it is for immediate execution. The receiver 1302 is typically an antenna but may be any device for receiving signals by a mobile terminal 6001.

An order processor 1304 is operable to process the received order to identify the indication that the order is for immediate execution and to execute the order overriding any manual mode of the mobile terminal 6001 so as to switch the access network to which the mobile terminal 6001 is connected. The order processor 1304 may be implemented by a DSP or any other known hardware component.

Figure 16:
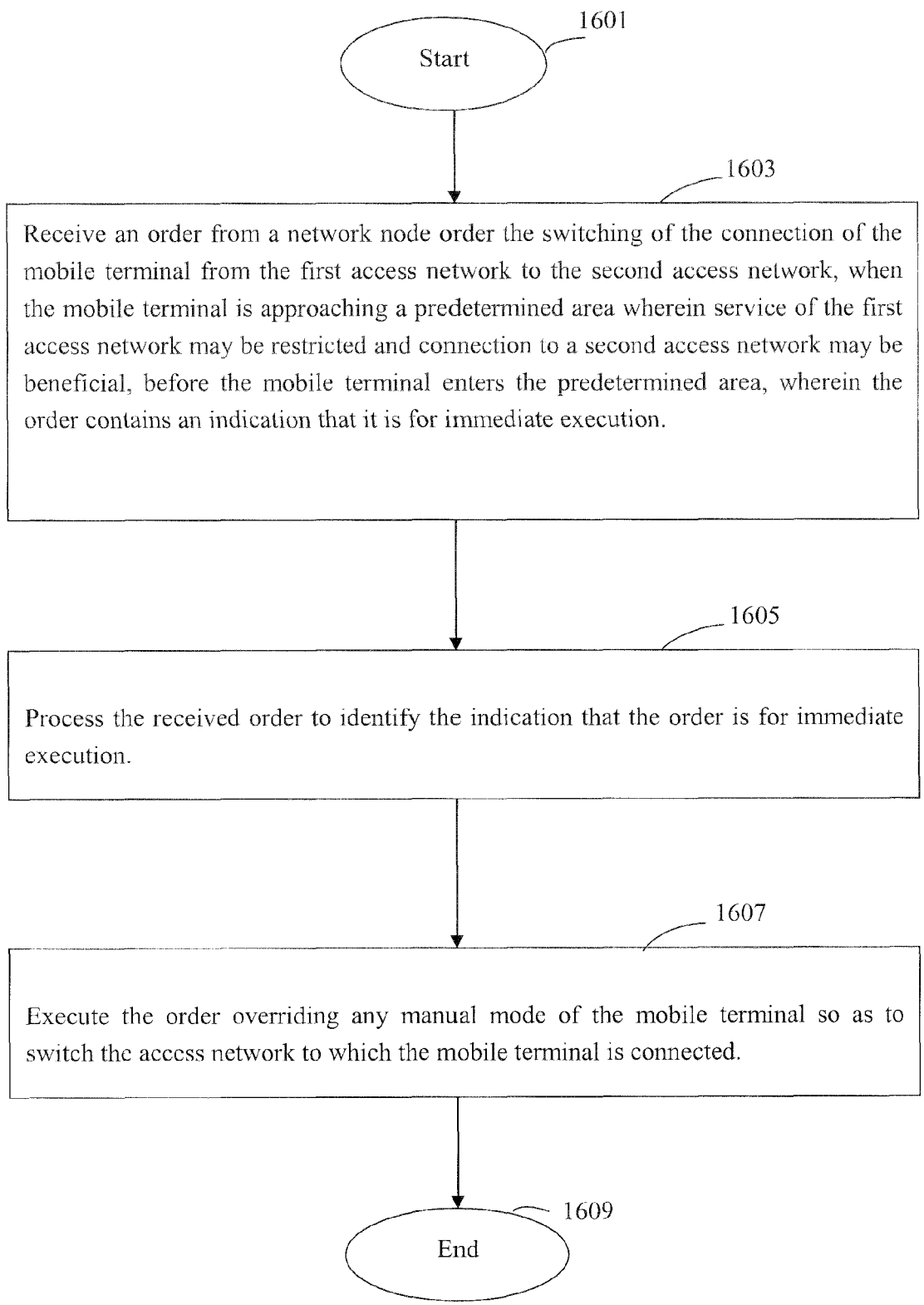
FIG. 16 is a flow chart summarising the key processes in a method of operating a mobile terminal to switch between a connection to a first access network and a connection to a second access network according to an embodiment of the invention.

FIG. 16 is a flow chart summarising the key processes in a method of operating a mobile terminal 6001 to switch between a connection to a first access network 3002 and a connection to a second access network 3003 according to an embodiment of the invention.

The method begins at 1601.

The method then proceeds to process 1603, at which an order is received by the mobile terminal 6001 from a network node ordering the switching of the connection of the mobile terminal 6001 from the first access network 3002 to the second access network 3003. This order is received when the mobile terminal 6001 is approaching a predetermined area wherein service of the first access network 3002 may be restricted and connection to a second access network 3003 may be beneficial, before the mobile terminal 6001 enters the predetermined area. The order contains an indication that it is for immediate execution.

The method then proceeds to process 1605, at which the received order is processed by the mobile terminal 6001 to identify the indication that the order is for immediate execution.

The method then proceeds to process 1607, at which the order is executed by the mobile terminal 6001 overriding any manual mode of the mobile terminal 6001 so as to switch the access network to which the mobile terminal 6001 is connected.

The method then proceeds to process 1609, at which it ends.

Embodiments of the invention are applicable to multi-access network UEs that are moving towards a restricted area for an access network.

Embodiments enable the UE 6001 to provide seamless transition to an alternative access network for which there is no restricted area along the projected trajectory of the UE.

The switch process is therefore performed without any service interruption.

Since the UE 6001 is able to switch to an alternative access network for which there is not a restricted area in the area that the UE is about to enter, and the switch process is done prior to the UE entering that area, the user does not perceive any significant interruption of service.

Therefore, the user experiences no loss of service, the user is not disturbed with the configuration of access network selection, and in case the UE is engaged in a telephone call or using IP services, the service continues as if no transition had happened.

An embodiment of the invention also provides a cost reduction for the operator, since it will not need to invest on intra-tunnel radio coverage deployments and can charge for its services without the services being disrupted by a loss of connection in restricted areas.

The foregoing description of embodiments has been presented for the purpose of illustration and description. It is not intended to be exhaustive or to limit the invention to the precise form disclosed. In light of the foregoing description, it will be evident to a person skilled in the art that many alterations, modifications and variations can be made.

The invention claimed is:

1. An access network connection controller operable to control the switching of a connection between a mobile terminal to a first access network and the mobile terminal to a second access network, the access network connection controller comprising:
    a receiver operable to receive movement information representative of the movement of the mobile terminal connected to the first access network;
    a data store configured to store data defining a boundary of a restricted area and data defining a threshold in advance of the boundary;
    an approach detector operable to determine from the movement information whether the mobile terminal is approaching the restricted area wherein service of the first access network may be restricted and connection to a second access network may be beneficial, wherein the approach detector comprises:
        a predicted trajectory generator operable to generate data defining a predicted trajectory of the mobile terminal in dependence upon the movement information, wherein the predicted trajectory generator is further operable to determine a time at which the mobile terminal is expected to cross the threshold of the boundary; and
        a comparer operable to compare the data defining the predicted trajectory with data defining the restricted area to determine whether the mobile terminal is approaching the restricted area; and
    a switching controller operable, in response to a determination by the approach detector that the mobile terminal is approaching the restricted area, to select the second access network and to generate a command ordering the switching of the connection of the mobile terminal from the first access network to the second access network before the mobile terminal enters the restricted area, wherein the switching controller is arranged to generate the command at the determined time, or at a time in advance of the determined time, to enable the mobile terminal to switch networks before reaching the boundary of the restricted area.

2. The access network connection controller according to claim 1, wherein the access network connection controller is operable to send the generated command to an Access Network Discovery and Selection Function network element.

3. The access network connection controller according to claim 1, wherein the switching controller is operable to generate the command so that the command identifies the mobile terminal and the second access network to which the mobile terminal should switch.

4. The access network connection controller according to claim 1, wherein the access network connection controller is operable to communicate with at least one node in a mobile communications network to obtain therefrom the movement information representative of the movement of the mobile terminal.

5. The access network connection controller according to claim 4, wherein the access network connection controller is operable to communicate with at least one of a Gateway Mobile Location Center, a Presence Server, and an Access Network Discovery and Selection Function network element to obtain the movement information therefrom.

6. A method of controlling the switching of a connection between a mobile terminal to a first access network and the mobile terminal to a second access network, the method comprising:
    receiving movement information representative of the movement of the mobile terminal connected to the first access network;
    storing data defining a boundary of a restricted area and data defining a threshold in advance of the boundary;
    determining from the movement information whether the mobile terminal is approaching a restricted area wherein service of the first access network may be restricted and connection to a second access network may be beneficial, wherein the determining from the movement information whether the mobile terminal is approaching the restricted area comprises:
        generating data defining a predicted trajectory of the mobile terminal in dependence upon the movement information, wherein the generating data defining the predicted trajectory of the mobile terminal further determines a time at which the mobile terminal is expected to cross the threshold of the boundary; and
        comparing the data defining the predicted trajectory with data defining the restricted area to determine whether the mobile terminal is approaching the restricted area; and
    in response to a determination that the mobile terminal is approaching a restricted area, selecting a second access network and generating a command ordering the switching of the connection of the mobile terminal from the first access network to the second access network, wherein the generating the command generates the command at the determined time, or at a time in advance of the determined time, to enable the mobile terminal to switch networks before reaching the boundary of the restricted area.

7. The method according to claim 6, further comprising the process of sending the generated command to an Access Network Discovery and Selection Function network element.

8. The method according to claim 6, wherein the process of generating a command generates the command so that the command identifies the mobile terminal and the second access network to which the mobile terminal should switch.

9. The method according to claim 6, further comprising the process of communicating with at least one node in a mobile communications network to obtain therefrom the movement information representative of the movement of the mobile terminal.

10. The method according to claim 9, wherein the at least one node comprising one of a Gateway Mobile Location Center, a Presence Server, and an Access Network Discovery and Selection Function network element.

* * * * *

UNITED STATES PATENT AND TRADEMARK OFFICE
CERTIFICATE OF CORRECTION

PATENT NO. : 8,605,683 B2
APPLICATION NO. : 13/702346
DATED : December 10, 2013
INVENTOR(S) : Garcia Martin et al.

It is certified that error appears in the above-identified patent and that said Letters Patent is hereby corrected as shown below:

On the Title Page, item (75), under "Inventors", in Column 1, Lines 1-2, delete "Pozuelo de Alarcon" and insert -- Pozuelo de Alarcón --, therefor.

In the Specification

In Column 2, Line 6, delete "an which" and insert -- in which --, therefor.

In Column 2, Line 46, delete "ANDSF 814" and insert -- ANDSF S14 --, therefor.

In Column 2, Line 63, delete "V-ANDSF 1001" and insert -- V-ANDSF 1003 --, therefor.

In Column 4, Line 21, delete "ANDS' 2002" and insert -- ANDSF 2002 --, therefor.

In Column 5, Line 4, delete "an special" and insert -- a special --, therefor.

In Column 6, Line 56, delete "LIST OF FIGURES" and insert -- BRIEF DESCRIPTION OF THE DRAWINGS --, therefor.

In Column 7, Line 67, delete "[Description of Embodiments]" and insert -- DETAILED DESCRIPTION OF THE EMBODIMENTS --, therefor.

In Column 9, Line 6, delete "LIE." and insert -- UE. --, therefor.

In Column 11, Line 5, delete "ADNSF 6005" and insert -- ANDSF 6005 --, therefor.

In Column 12, Line 61, delete "a explicit" and insert -- an explicit --, therefor.

In Column 13, Line 49, delete "GLMC 6004" and insert -- GMLC 6004 --, therefor.

In Column 16, Line 66, delete "receiver 1002" and insert -- receiver 1102 --, therefor.

Signed and Sealed this
Twenty-ninth Day of July, 2014

Michelle K. Lee
*Deputy Director of the United States Patent and Trademark Office*